(12) United States Patent
Tilford et al.

(10) Patent No.: US 7,350,477 B1
(45) Date of Patent: Apr. 1, 2008

(54) CAKE DECORATING MINE

(76) Inventors: Janis Lynne Tilford, 5975 Calle Entrada, Yorba Linda, CA (US) 92887-3532; Arthur Robert Tilford, 5975 Calle Entrada, Yorba Linda, CA (US) 92887-3532

( * ) Notice: Subject to any disclaimer, the term of this patent is extended or adjusted under 35 U.S.C. 154(b) by 328 days.

(21) Appl. No.: 11/053,464

(22) Filed: Feb. 9, 2005

Related U.S. Application Data

(60) Provisional application No. 60/583,630, filed on Jun. 30, 2004.

(51) Int. Cl.
*B05C 19/04* (2006.01)

(52) U.S. Cl. .............................. 118/13; 118/14; 118/24; 118/308

(58) Field of Classification Search .................. 118/13, 118/14, 24, 308; 446/475; 124/64, 71; 222/637
See application file for complete search history.

(56) References Cited

U.S. PATENT DOCUMENTS

| 4,076,006 | A | * | 2/1978 | Breslow et al. | ............... 124/64 |
|---|---|---|---|---|---|
| 4,432,473 | A | * | 2/1984 | MacEwen | .................... 222/327 |
| 4,961,517 | A | * | 10/1990 | Tkac | ............................ 222/94 |
| 4,966,537 | A | * | 10/1990 | Bowles et al. | ................. 425/87 |
| 5,015,211 | A | * | 5/1991 | Reveen | ........................ 446/475 |
| 5,664,551 | A | * | 9/1997 | Spector | ........................ 124/16 |
| 5,683,762 | A | * | 11/1997 | Banschick | ..................... 428/4 |
| 5,772,491 | A | * | 6/1998 | Watkins | ...................... 446/475 |
| 6,450,160 | B1 | * | 9/2002 | Fu et al. | ......................... 124/57 |
| 6,572,435 | B1 | * | 6/2003 | Wong | .......................... 446/475 |
| 6,669,530 | B2 | * | 12/2003 | Du | .............................. 446/475 |
| 7,021,465 | B1 | * | 4/2006 | McGuigan | .................. 206/457 |

\* cited by examiner

*Primary Examiner*—Laura Edwards

(57) ABSTRACT

The invention relates to a cake-surrounded, self-standing device for applying, and a method for applying a decorative colorful rain of edible particles or sugars to the existing frosting, icing or prepared surface of same cake by launching small edible and delicate candy particles or sugars from a particle containing chamber within the cake by the use of a pressure controlled remote air pump, internal mechanical spring release piston, or pyrotechnic activated gas pressure piston in such a manner so as to control the height, direction and effect of the particles being released to a pre-determined height and returning back down onto and only onto the surface of the cake in a distinct and well defined pattern and in an entertaining and surprise fashion. Such an expelling device is known in the industry as a mine or a fountain.

10 Claims, 4 Drawing Sheets

CAKE DECORATING MINE

PRIOR APPLICATIONS

This application is based on provisional application No. 60/583,630 filed Jun. 30, 2004, and claim is made for the benefit of the filing date of the provisional application.

REFERENCES CITED

| | | | |
|---|---|---|---|
| 4,076,006 | February, 1978 | Breslow et al | 124/64 |
| 4,432,473 | February, 1984 | MacEwen | 222/327 |
| 4,961,517 | October, 1990 | Tkac | 222/94 |
| 4,966,537 | October, 1990 | Bowles et al | 425/87 |
| 5,015,211 | May, 1991 | Reveen | 446/475 |
| 5,664,551 | September, 1997 | Spector | 124/16 |
| 5,772,491 | June, 1998 | Watkins | 446/475 |
| 6,450,160 | September, 2002 | Fu et al | 124/57 |
| 6,572,435 | June, 2003 | Wong | 446/475 |
| 6,669,530 | December, 2003 | Du | 446/475 |

BACKGROUND OF THE INVENTION

Cake decoration has a long history with much effort placed upon the talents of the artist and his or her personal tools for the accomplishment of a highly decorated and much prized edible masterpiece. Variations in the methods and systems used in cake decorations have paralleled that of those used in artistic productions of statuary or fine art canvas work.

Decoration of cakes, pastries, ice cream, or the like foodstuffs with intimately bound frostings or icings is normally accomplished prior to sale of what is considered the finished product. Although frostings and icings have been usually applied using a baker's pastry bag, advancements toward improvements in the application of a cake decoration have been successful in new innovations disclosed in U.S. Pat. Nos. 4,432,473 and 4,966,537 using a hand-held cartridge type icing ejector, and U.S. Pat. No. 4,961,517 for applying multiple colored icings simultaneously to a cake surface.

This traditional cake decoration scenario reinforces the fact that cake-decorating products have always been intended for use in completing the decoration of a cake before it is presented.

Changes made to such intimately bound cake decorations as frosting or icing immediately prior to the presentation of such may involve the addition of minor components such as candles. However, the possibility of creating a change in the color, texture, and tapestry of a cake frosting or icing in an instant would be a very dramatic and desirable effect for many celebrations. A device capable of independently decorating a cake with colorful candy particles or sugars with a simple remote device could provide entertainment, surprise, and contribute to the celebratory occasions where decorated cakes find their place as traditions. It is with this in mind that the present invention has been developed from devices known as confetti launchers which include but are not inclusive of U.S. Pat. No. 4,076,006 which teaches the use of an air bulb for launching, U.S. Pat. No. 5,015,211 which teaches the use of an air cartridge for confetti launching to obtain great distances, U.S. Pat. No. 5,664,551 which teaches the use of a spring to launch, U.S. Pat. Nos. 5,772,491 and 6,450,160 which both teach the use of a removable air gas cartridge system, U.S. Pat. Nos. 6,572,435 and 6,669,530 both teach of the use of a spring loaded confetti hand held device. All are examples of such devices created to expel or launch confetti components in an entertaining manner and to be expelled to the maximum distance possible by the device design. Use of existing devices was unrealistic due to the nature of the devices, which are constructed to release confetti with a maximum of force and to reach a maximum distance. Restricting the output distance and shaping of the output burst of particles was not an issue of consideration. It was therefore necessary to create an entirely new particle ejecting method and device that would allow edible particle to emerge into a specific fountain-like geometric form and with a specific and limited distance so as to allow the resulting particle rain to land upon a specific surface area of the cake.

It is the intent of this patent to provide a new party celebration device heretofore not considered. The device is an edible particle ejecting mine designed in such a manner so as to produce a controlled and limited distance, shaped burst of edible particles from a location central to the cake itself and with the result of raining edible fallout for the purpose of imparting a change to the existing cake surface in a surprising and entertaining manner.

Although the invention is intended for use with a bundt, an angel food, or a similar shaped cake, having a central vertical opening or hole, creativity will allow its use with other pastries, pies, and even molded ice cream or gelatin desserts and to be co-located close to, or central to the cake as the individual case may dictate.

SUMMARY OF THE INVENTION

An objective of the present invention is to provide a device for applying solid edible particles onto a sticky frosting or icing layer with a minimum of human force and effort.

Another objective of the present invention is to provide a device for applying solid edible particles onto a sticky frosting or icing surface in a manner that creates a decorated appearance on the frosting or icing surface for celebration.

Another objective of the present invention is to provide a device for ejecting edible particles vertically into the air in a controlled manner so that the correct low altitude is achieved to allow the edible particles to fall directly onto a sticky frosting or icing of a cake that is a short distance directly below.

Another objective of the present invention is to provide a device for applying solid edible particles onto a sticky frosting or icing surface of a cake from within said cake and hidden from view so that an element of surprise is created for entertainment purposes.

The above objectives and other objectives can be obtained by a device for ejecting edible solid particles from a cartridge within a cartridge container. The cartridge container is open at one end and attached to a platform comprising an air cavity and an air input port at the other end. The cartridge has a cartridge outlet at one end in the direction of the open end of the cartridge container, and an internal moveable disc at the other end. A pump comprising a plunger mounted for movement within a cylinder attached to one end of a hose, and the platform to the other end of the hose.

The device including:

a cartridge container defining an internal chamber constructed and arranged to contain a cartridge therein, a cartridge defining a cylinder constructed and arranged to contain a lower internally moveable disc, edible particles, and a thinly sealed upper opening, a platform defining an internal air chamber, an internal air canal from the internal air chamber to an air input port, and a surface for mounting a cake, a flexible air hose connected from the platform air input port to an air output port at a remote pump, a remote pump including: a vertical cylinder, an air output port, a closed lower end, a closed upper end containing a central opening through which a shaft passes, a vertical shaft coupled between a hand moveable external handle and an internal piston which creates a single burst of air, and an air output port, Whereby, when a cartridge containing edible particles, is disposed in the cartridge container and the cartridge container attached to the platform, and the input port of the platform is connected with the hose to the remote cylinder, the hand operated plunger moves the piston down and the piston creates a burst of air which therefore travels through the air output port through the air hose to the platform air input port through the platform air canal into the internal air chamber and beyond to the cartridge causing the cartridge moveable disc to eject the contents of edible particles within the cartridge through the thinly sealed upper opening of the cartridge container and into the air, whereby, the edible particles reach a pre-defined and limited altitude, gravity reverses their movement direction and they fall directly onto the sticky cake frosting or icing imparting a new layer over the frosting or icing comprised of the colored edible particles. The result of which is a new layer of colored edible particles covering the frosting or icing of the cake.

In accordance with another aspect of the invention, a method is provided for ejecting edible color particles onto a cake frosting or icing from a cartridge container having an attached air chamber including:

a mechanical spring-operated piston and an associated release mechanism.

In accordance with still another aspect of the invention, a method is provided for ejecting edible color particles onto a cake frosting or icing from a cartridge container having an attached air chamber including:

a piston operated by a party popper.

The present invention also provides a device for ejecting edible color particles onto a cake frosting or icing from a cartridge-less hollow tube or mortar having an opening at one end and an air cavity at the other end.

The device including:

a hollow tube or mortar with an internal chamber constructed and arranged to contain a mesh screen, a piston disc and an end plug or cap therein, a platform defining an internal air chamber, an internal air canal from the internal air chamber to an air input port, and a surface for mounting a cake, a flexible air hose connected from the platform air input port to an air output port at a remote pump, a remote pump comprising: a vertical cylinder, an air output port, a closed lower end, a closed upper end containing a central opening through which a shaft passes, a vertical shaft coupled between a hand moveable external handle and an internal piston which creates a single burst of air, and an air output port.

Whereby, when a measured quantity of edible colored particles are disposed into the hollow tube or mortar cartridge between the piston disc and end plug or cap and the platform input port is connected with the hose, the hand-operated pump plunger moves the piston and the piston creates a burst of air traveling from the pump through the air hose to the hollow tube or mortar piston disc, forcing the edible particles and the plug out of the hollow tube or mortar into the air, and onto the cake frosting.

In accordance with another aspect of the invention, a method is provided for ejecting edible color particles onto a cake frosting or icing from a hollow tube or mortar having an attached air chamber including:

a mechanical spring-operated piston and an associated release mechanism.

In accordance with still another aspect of the invention, a method is provided for ejecting edible color particles onto a cake frosting or icing from a hollow tube or mortar having an attached air chamber including:

a piston operated by a party popper.

Other objects, features and characteristics of the present invention, as well as the methods of operation and the functions of the related elements of the structure, the combination of parts and economics of manufacture will become more apparent upon consideration of the following detailed description and with reference to the accompanying drawings.

DETAILED DESCRIPTION OF PREFERRED EMBODIMENTS

Figure 1:
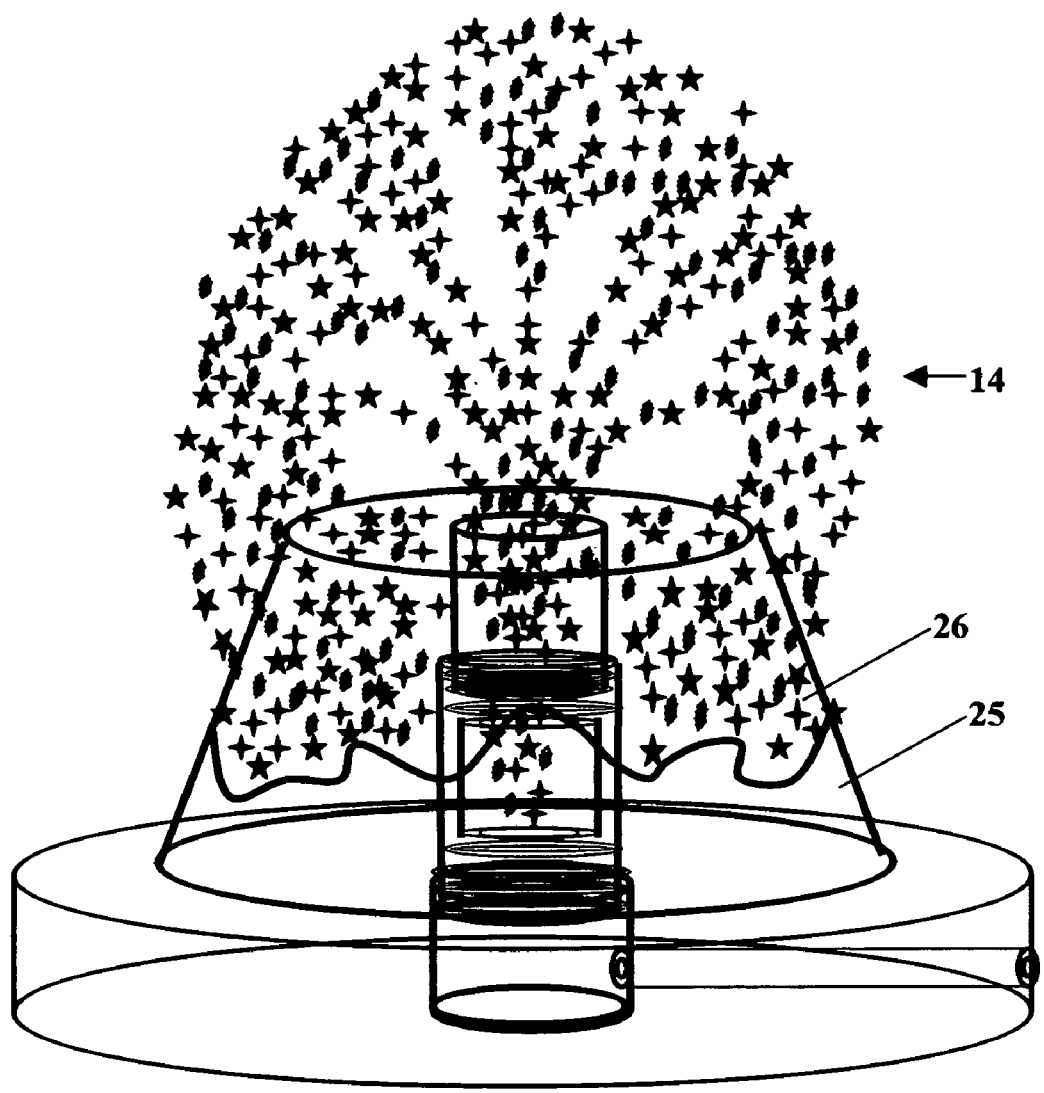
FIG. 1 illustrates a view of the system in operation according to the present invention.

The invention will now be described with reference to the attached figures. FIG. 1 illustrates the present invention in operation demonstrating the effect of decoration of the frosting or icing 26 on the cake 25 with edible color "fallout" 14 from the device.

Figure 2:
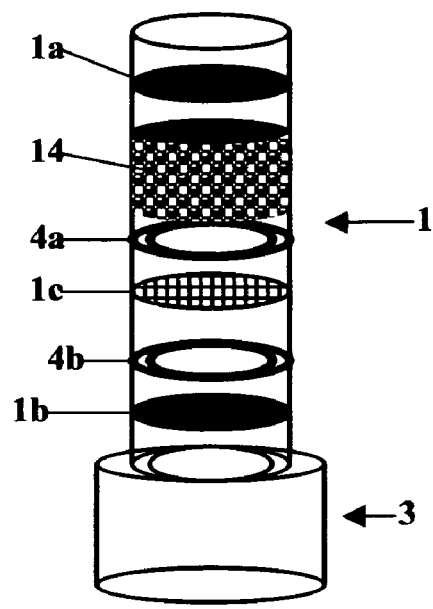
FIG. 2 illustrates a cross-sectional side view of the hollow tube or mortar cartridgeless system, according to the present invention.

FIG. 2 provides a cross-sectional side view of a method of ejecting edible particles from a hollow tube or mortar 1. Positioned upon an air chamber 3, the hollow tube or mortar 1 is filled with a series of elements including air and pressure control devices and the edible particles 14 to be ejected. Acting as an air piston, disc 1b is first placed at the lowest end of hollow tube or mortar 1. A permanent internal lip 4b is located a distance from the air piston disc 1b as a piston stop. Another permanent internal lip 4a sandwiches an air transparent mesh disc 1c. This mesh disc 1c prevents the ejectable particles from passing into the lower air chamber 3. A measure of edible particles 14 is then poured into the hollow tube or mortar and rest upon the mesh disc 1c. A solid disc 1a in the form of a plug or cap is placed at the end and most upright portion of the hollow tube or mortar 1.

Figure 3:
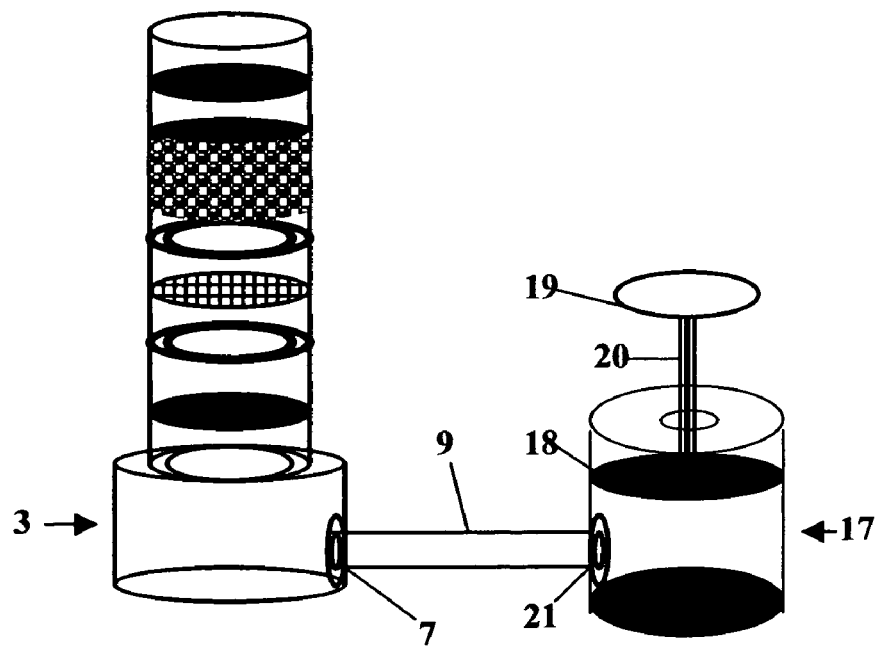
FIG. 3 illustrates a cross-sectional side view of the hollow tube or mortar cartridge-less system, with the addition of the remote pump according to the present invention.

FIG. 3 provides a cross-sectional view of the means of propulsion for the edible particles. An entrance opening 7 provides a method of air entry into chamber 3. Attached to this opening 7 and an air exit port 21 located at the hand pump 17 is an air hose 9. The pump 17 is composed of a short cylinder and a plunger. The short cylinder is composed of one end closed with a solid disc while the other end is closed with a disc comprising a central circular opening. A plunger comprising a plunger shaft 20, a disc-like handle 19, and a piston 18 is used to create compressed air through an exit port 21. The escaping air travels through a flexible tube 9, into the air chamber port 7 to fill the air chamber 3. As the air within the air chamber 3 compresses, the pressure travels upward forcing the ejection of edible particles.

The hollow tube design is complex to work since it requires specific: manipulations and measurements by its operator. The present invention is a preferred embodiment of the simpler, easy-to-use device and is illustrated in FIGS. 4 and 5.

Figure 4:
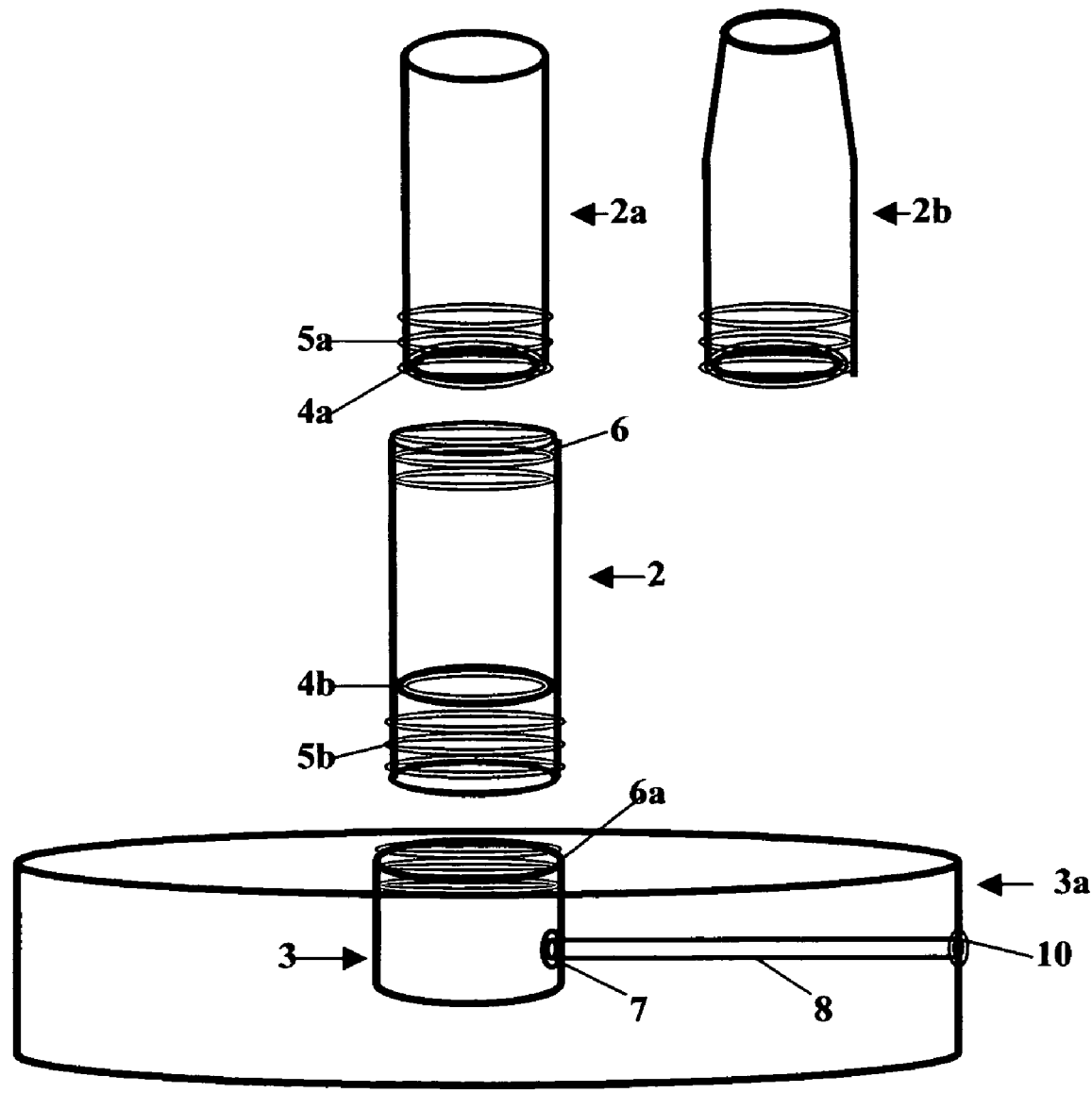
FIG. 4 illustrates a cross-sectional side view of the cartridge container system according to the present invention.

FIG. 4 illustrates the design of the cartridge-containing device. This is the preferred embodiment which makes use of pre-filled cartridges, FIG. 6, that eliminate the work necessary for the operator to replace multiple components, obtain the correct edible particle size, measure the correct amount of edible particles to insert and clean up any resulting mess. The device FIG. 4 is composed of three separate pieces, the base 3a with internal air chamber 3, the lower cartridge tube 2, and upper ejection tube 2a. Upper ejection tube 2a is provided with outer surface screw threads 5a at one end. These allow tube 2a to be attached, via screwed rotation, into tube 2 by the use of the provided internal threads 6 of tube 2. Likewise, tube 2 is attached by screwed rotation with its own outer surface threads 5b into base 3a where internal threads 6a have been provided. The upper tube 2a is provided with an internal lip 4a at its threaded end, which holds the internal cartridge in place against the internal lip 4b of the lower tube 2. Upper tube 2b demonstrates an alternate choked ejection port, which defines the pattern of the particle spray and fallout area from the geometry of the opening. The spray shape is therefore defined by the contour and size of the ejection port.

The air chamber 3 is an intimate component of the cake-supporting base 3a. Within the cake-supporting base 3a is an air transport tube 8, which connects an opening 7 of the air chamber 3 to an air port 10 at the side of the base 3a.

Figure 5:
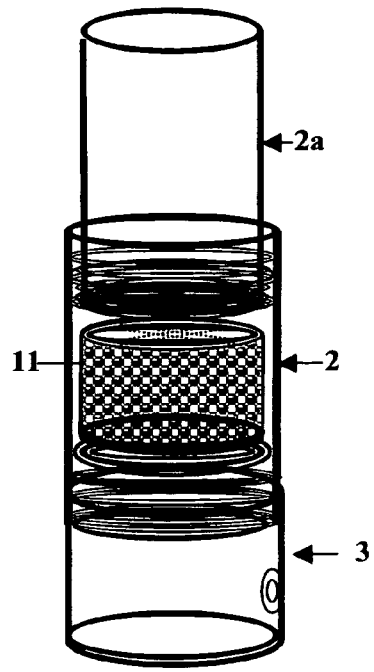
FIG. 5 illustrates a cross-sectional side view of the assembled cartridge container with indication of cartridge location, according to the present invention.

FIG. 5 illustrates the preferred device as a completed assembly with the lower cartridge tube 2 attached to the air chamber 3, the edible particle-containing cartridge 11 in place and the upper ejection tube 2a attached to the lower tube 2. The diameter of the completed tube array has a diameter slightly less than that of the central hole of its associated cake. The length of the combination of tubes 2 and 2a is not longer than the height of the associated cake, which will surround it when placed upon the upper surface of the cake platform.

Figure 6:
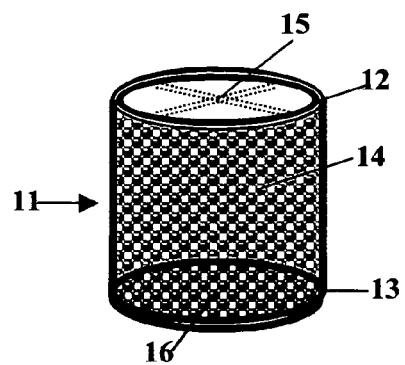
FIG. 6 illustrates a cross-sectional side view of the cartridge, according to the present invention.

FIG. 6 illustrates the design of the edible particle cartridge. The cartridge is filled with edible colored particles, which are seated upon a solid disc 16, the disc of which rests upon an internal lip 13 of the cartridge. The edible particles are sealed within the cartridge with a cap 12 and associated thin membrane window 15. The thin membrane window 15 is designed with a perforated cross cut which is strong enough to retain the particles but gives way as the particles are ejected from the cartridge by air pressure.

Figure 7:
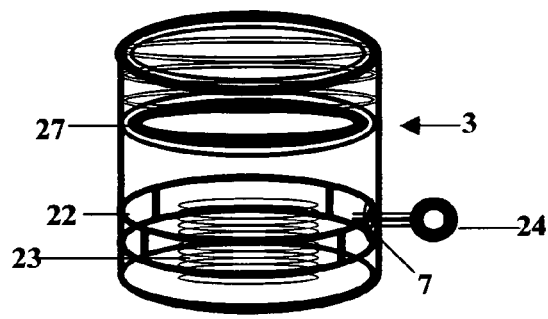
FIG. 7 illustrates a cross-sectional side view of the spring-operated piston, according to the present invention.

FIG. 7 illustrates another embodiment of the air chamber 3. Air pressure is created with the use of a piston 22 resting upon a mechanical spring 23. The device is activated when the spring is compressed and locked in place with a sliding pin 24. When the sliding pin 24 is pulled out of air chamber port 7, the spring is released forcing the piston 22 upward to stop at an internal stop lip 27 creating air pressure which then causes the edible particles to eject.

Figure 8:
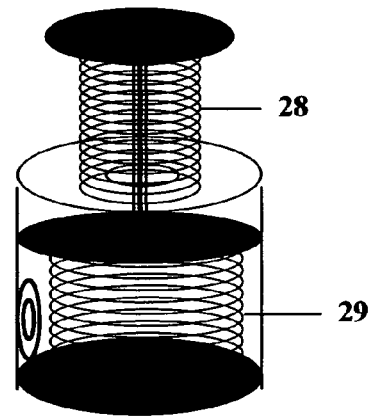
FIG. 8 illustrates a cross-sectional side view of the pump with action and dampening springs, according to the present invention.

FIG. 8 illustrates another embodiment of the air pump whereby the particle-containing tube is activated by controlled air pressure. The plunger shaft is surrounded with a holding spring 28 at one end while the other end is attached to a sliding piston, which rests upon a dampening spring 29. The use of one or both of these two springs maintains the appropriate control of air pressure and flow that will escape.

Other embodiments of this device can include, but are not limited to electrical control of the mechanical spring, a self-contained pump burst device within the air cylinder such as a piezo crystal pump or motor, compressed air or gas cylinder activation, and devices such as a party popper, a pulling firework, or other low load pyrotechnic discharge devices.

We claim:

1. A device for decorating a cake comprising a platform having a surface for supporting a cake; a removable cartridge for containing edible particles; a holding chamber for receiving the removable cartridge storing the edible particles; an air chamber beneath the holding chamber, the air chamber being centrally disposed in said platform for receiving said holding chamber and for exerting a controlled amount of air pressure on said edible particles in said holding chamber and into the cartridge; an air transport tube in the platform, the air tube in fluid communication with the air chamber at one end and in fluid communication with a exterior peripheral surface of the platform at an opposite end; and a particle release mechanism in communication with the holding chamber wherein said air chamber exerts said controlled amount of air pressure on said edible particles to cause said edible particles to exit from said holding chamber in a controlled and limited distance, via an exhaust port of said cartridge, said exhaust port configured to disperse the edible particles as a fountain into space above the cake, reaching a pre-determined zenith point where said edible particles then return downward onto said cake.

2. The device according to claim 1, further comprising said particle release mechanism being said air chamber with an associated air hose and remote pump.

3. The device according to claim 1, further comprising said particle release mechanism being said air chamber containing a spring ejection device.

4. The device according to claim 1, further comprising said particle release mechanism being said air chamber containing a pyrotechnic-activated gas generating device.

5. The device according to claim 2, further comprising said associated air hose and remote pump constructed to allow the release of said controlled amount of air pressure upon said edible particles.

6. The device according to claim 4, further comprising said pyrotechnic activated gas generating device composed of a party popper containing pyrotechnic load constructed in such a manner as to allow the release of a controlled amount of air pressure upon said edible particles.

7. The device according to claim 2, further comprising said air hose constructed of a predetermined length and diameter to control the force of air pressure on said edible particles.

8. The device according to claim 2, further comprising said remote pump constructed with dampened spring action to control the force of air pressure upon said edible particles.

9. The device according to claim 2, further comprising said remote pump constructed as a bellows with dampened movement to control the force of air pressure upon said edible particles.

10. The device according to claim 7, further comprising said remote pump constructed with a holding trigger and associated springs to allow the release of air pressure from a compressed spring locked position.

* * * * *